United States Patent [19]

Russo

[11] Patent Number: 5,377,305
[45] Date of Patent: Dec. 27, 1994

[54] OUTER PRODUCT NEURAL NETWORK

[75] Inventor: Leonard E. Russo, Nashua, N.H.

[73] Assignee: Lockheed Sanders, Inc., Nashua, N.H.

[21] Appl. No.: 769,608

[22] Filed: Oct. 1, 1991

[51] Int. Cl.$^5$ ............................................. G06F 15/18
[52] U.S. Cl. ..................................... 395/11; 395/21; 395/23; 395/24
[58] Field of Search ...................... 395/11, 24, 27, 23, 395/22, 21

[56] References Cited

U.S. PATENT DOCUMENTS 4,719,591 1/1988 Hopfield et al. ..................... 364/807

OTHER PUBLICATIONS

Ballard, D. H., "Modular Learning in Neural Networks", Proceedings AAAI-87, Jul. 1987, 279–284.
Keeler, J. D., "Information Capacity of Outer-Product Neural Networks", Physics Letters, Sep. 1987, 53–58.
Oja et al., "The Subspace Learning Algorithm as a Formalism for Pattern Recognition and Neural Networks", IEEE Conf. Neural Networks, Jul. 1988, I-277-I-284.
Sanger, T. D., "An Optimality Principal for Unsupervised Learning", in Adv. in Neural Info. Processing Systems, vol. 1, 1989, 11–19.
Kramer, M. A., "Nonlinear Principal Component Analysis Using Autoassociative Neural Networks", AICHE Journal, Feb. 1991, 233–243.
Kung, S. Y., "Orthogonal Learning Network for Constrained Principal Component Problems," IJCNN, Jun. 1990, I-441-I-449.
Taur, et al., "Comparison of Several Learning Subspace Methods for Classification", ICASSP 91, May 1991, 1069–1072.
Russo, L. E., "An Outer Product Neural Network for Extracting Principal Components from a Time Series," Neural Networks for Signal Processing, 30 Sep.–1 Oct. 1991, 161–170.

Primary Examiner—Robert W. Downs
Attorney, Agent, or Firm—David W. Gomes

[57] ABSTRACT

An outer product neural network provides a predetermined number of processing elements for extracting principal components of an input vector. The residual vector of the network when cascaded into a similar outer product neural network provides additional principal components defining a subspace orthogonal to the subspace defined by the principal components of the first network.

5 Claims, 1 Drawing Sheet

OUTER PRODUCT NEURAL NETWORK

BACKGROUND OF THE INVENTION

1. Field of the Invention

The present invention generally relates to neural networks and particularly to outer product neural networks used to extract principal components from any type of signal.

2. Statement of the Prior Art

The term "neural network" is used here to describe any conglomeration of parallel, identical processor elements (PEs) whether linear or non-linear which may be jointly trained to achieve some state or minimal condition based on minimizing a constraint. The term "principal components" is being used loosely here as the major energy modes of the signal of interest. The signal of interest may be any one to n-dimensional signal such as a time series, image or n-dimensional feature vectors.

Beginning with Oja (E. Oja, "A Simplified Neuron Model As A Principal Component Analyzer": *J. Math. Biology*, vol. 15, pp. 267-273, 1982), it was recognized that neural networks could be used to extract principal components from a signal. Formally, principal components are the axes of an n-dimensional Gaussian signal; here, the term is used somewhat loosely to describe the principal modes and components of a signal. If most of the signal energy may be represented by a few principal components or modes, then the signal may be 'explained' by those few principal components resulting in a reduced-rank representation of the signal. For instance, the reconstituted signal derived from the principal components may be used in place of the original signal and the principal components may be used for signal transmission and storage representing the original signal in compressed form. This will also, in general gain some advantage such as eliminating noise or enhancing the signal for subsequent processing based on signal rank.

Oja's rule was sufficient for extracting the single, largest principal component from a signal but could not extract multiple principal components. Sanger (T. Sanger, "Optimal Unsupervised Learning In A Single Layer Feed Forward Neural Network", presented at *NIPS*, Denver, Colo., Nov. 29–Dec. 1, 1988, pp 1-17) revised Oja's network and rule to enable extraction of multiple principal components. Sanger's rule required interconnection among the processor elements to enforce orthogonality. This is required as the principal component must form an orthonormal basis for the principal component subspace. Sanger also required a second normalization step.

More recently, Foldiak (P. Foldiak, "Adaptive Network For Optimal Linear Feature Extraction", *Proc. IJCNN*, pp. 1401-1406, Washington, D.C., 1989) and Kung (S. Y. Kung and K. I. Diamantaras, "A Neural Network Learning Algorithm For Adaptive Principal Components Extraction (APEX)", in *Proc. ICASSP*, vol. 2, pp. 861-864, 1990) have devised neural networks for extracting principal components. The updating rules for these networks also have interconnections among the processor elements to enforce the 'anti-Hebbian' training, i.e. to constrain the principal components to be orthonormal. Of course, these additional connections require more processing be done for the network to converge.

Oja (E. Oja, "Neural Networks, Principal Components, and Subspaces", *Int. J. Neural Systems*, Vol. 1, No. 1, pp. 61-68, 1989) extended his original seminal paper based on a different line of reasoning which rendered his network very sensitive, and somewhat unstable, to training parameters.

SUMMARY OF THE INVENTION

Accordingly, the present invention provides a neural network system, including a plurality of cascade coupled neural network means for producing an output vector including a predetermined number of principal components of an input vector and a residual vector with each subsequently coupled network means receiving as an input vector the residual vector of the immediately preceedingly coupled network means and each network means having an outer product architecture, and means for training each neural network means to converge to a projector of a subspace of its respective principal components with the principal component subspace of each network means being orthogonal to the principal component subspace of the immediately preceedingly coupled network means.

In a different form, the present invention provides a neural network including an outer product architecture including a plurality of input nodes for receiving the elements of an input vector, a plurality of output nodes for providing an output vector, and a predetermined number of processing elements representing principal components of the input signal with said principal components defining a subspace thereof, and means for training the network to produce an output vector representing a projector of the input vector on to the subspace of the principal components, wherein the means for training includes the training rule $$C_{n+1} = [I + \gamma^*[xr^T + rx^T]] C_n$$

wherein $C_n$ is the present weight matrix for the processing elements, $C_{n+1}$ is the updated weight matrix, I is the Identity matrix, $\gamma$ is the update factor, x is the input vector, r is the current residual vector determined by subtracting the output vector from the input vector, and $T$ designates the transposed matrix.

BRIEF DESCRIPTION OF THE DRAWINGS

The present invention is illustratively described below in reference to the accompanying drawings of which.

DETAILED DESCRIPTION OF TEE DRAWINGS

The goal of principal components analysis is to represent the signal by a reduced-rank signal spanned by the principal components. In this way, the signal may be analyzed, enhanced and reconstructed. The way to find the reduced rank signal is to form a projector, P, onto the principal component subspace. If $\{u_i\}$, $i = 1 \ldots k$, is the set of orthonormal principal component vectors, and $U = [u_1, u_2, \ldots u_k]$ is a matrix formed by using the vector as column vectors of the matrix, then $P = UU^T$ is a projection matrix onto the principal component subspace. That is, operating on any vector with P will project that vector onto the subspace with basis $\{u_i\}$. Knowing P is equivalent to knowing the subspace spanned by the principal components.

Figure 1:
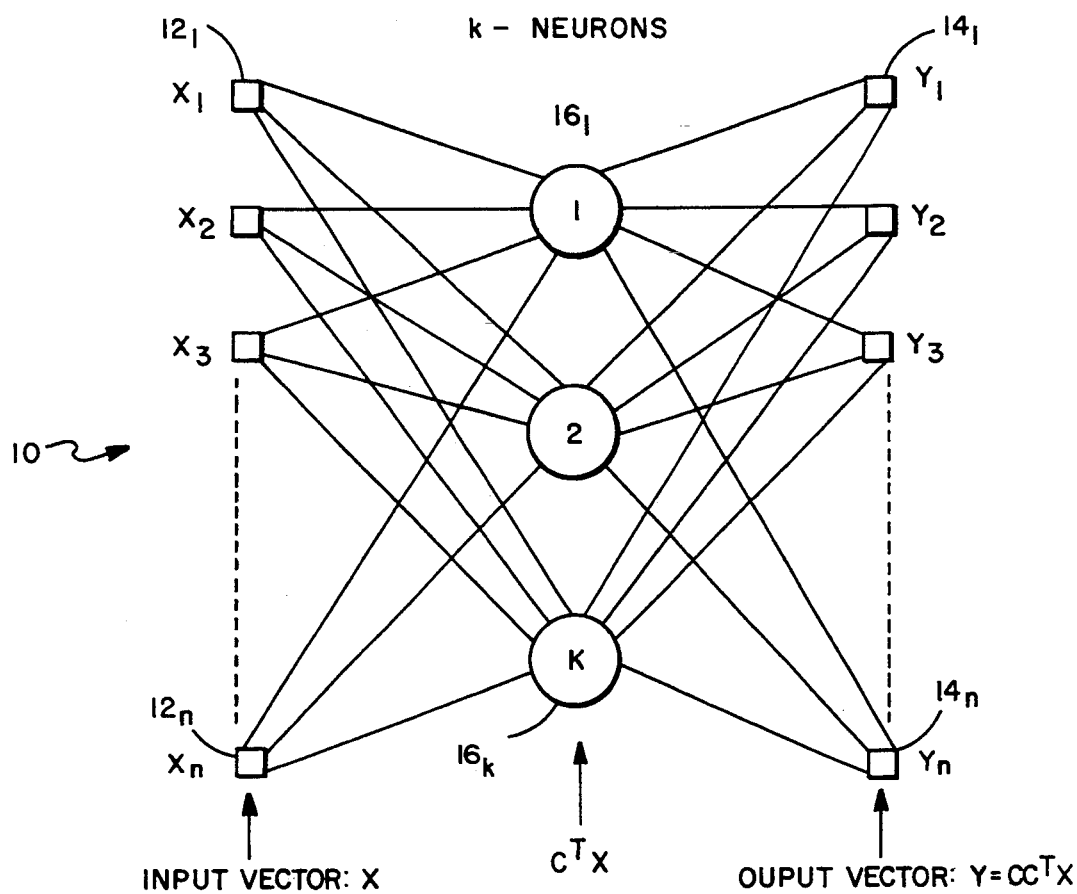
FIG. 1 is a schematic of a neural network constructed in accordance with one embodiment of the present invention.

One embodiment of the present invention is shown in FIG. 1. The neural network 10 generally includes a plurality of input nodes $12_1$-$12_n$, a plurality of output nodes $14_1$-$14_n$, and a plurality of processing elements $16_1$-$16_k$. The input nodes 12 correspond to each of the elements of the input vector to be coupled to the network 10 and the output nodes 14 correspond to each element of the output vector to be produced. The processor elements 16 collectively perform the matrix vector operations $CC^T$ and individually correspond to each of the principal components extracted from the input vector by the network 10. The principal components define a subspace for which the output vector is a projector or projection operator of the input vector onto that subspace. The input vector minus the output vector results in a residual vector which is first used for training and minimized, and then used as the input vector for a subsequently cascade coupled network similar to the network 10.

The network 10 is a linear network capable of extracting principal components and is trained on data exemplars. These exemplars may be feature vectors from images, modelled speech, time series, etc. The network 10 uses a symmetrized training rule which has empirically proved to be robust, and, if stable, the columns of the C-matrix always converge to the principal components, and the network, itself, converges to a projector spanning the principal component subspace. This subspace is induced by the data onto the C-matrix, i.e. the network is trained and learns the subspace. Once converged for stationary data, the network will project onto the subspace spanned by the k-most important principal components for a k-PE network. These components form a basis for the principal component subspace which will be a subspace of the data space. If the signal is non-stationary, but slowly varying with respect to the training convergence rate, the network will track principal components.

The architecture and constraint or objective function for a neural network determine the training rule. Having determined the architecture, the objective function must be defined. For the network 10, the objective function is the mean squared error of the difference between input and output exemplars:

$$MSE = \|r\|^2 = \|x - CC^T x\|^2$$

Minimizing this function with respect to the coefficients of the C-matrix, and using a gradient descent approach, the following update or training rule results:

$$C_{n+1} = [I + \gamma[xr^T + rx^T]]C_n$$

This rule is unique and has been found to guarantee orthonormalization of the C-matrix under very nominal conditions. $CC^T$ converges to a projection matrix, P, and $I - CC^T = N$, converges to another projection matrix called the novelty. For any data exemplar, x, Px is orthogonal to Nx; therefore, the network residual, $r = (I - CC^T)x$ will converge to a subspace orthogonal to that spanned by the principal components of the P-subspace. This residual may be analyzed by another network similar to the network 10. In this way, by cascading networks, a signal may be decomposed into orthogonal subspaces.

Figure 2:
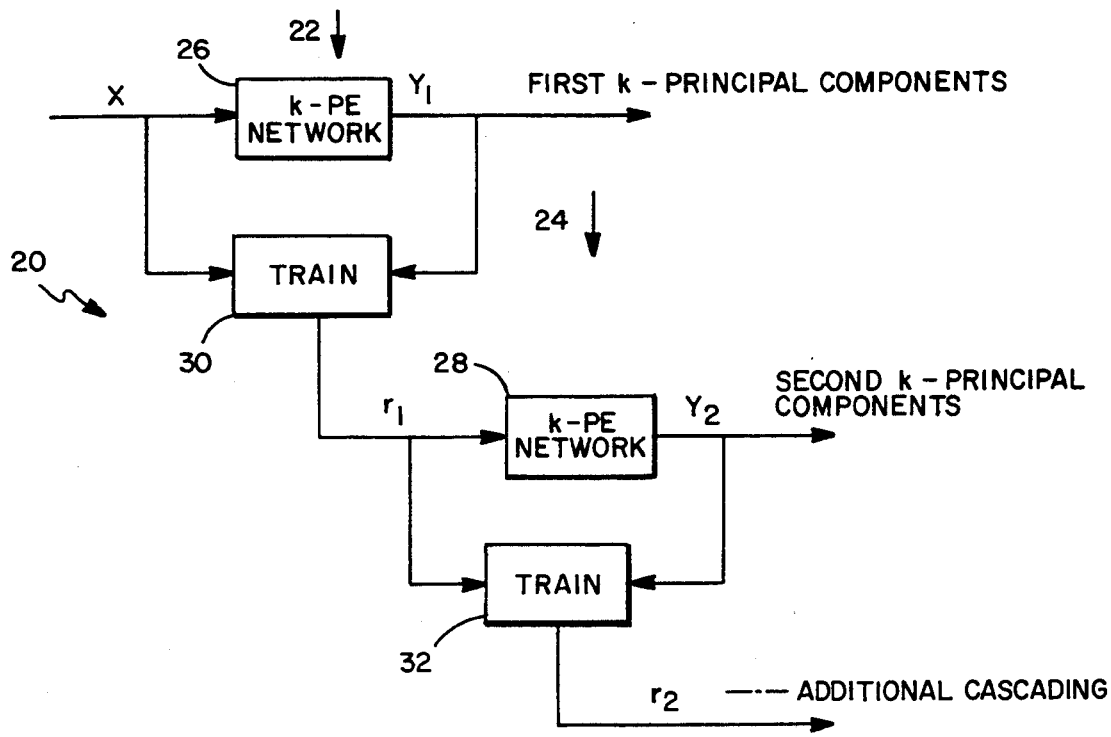
FIG. 2 is a block diagram of a plurality of neural networks cascaded in accordance with another embodiment of the present invention.

The cascading of such networks is shown in FIG. 2. The neural network system 20 includes a plurality of neural networks, or stages 22,24. Each network includes a network 26,28 of K processing elements and means for training 30,32 its respective network 26,28. The output vector and input vector to each cascaded stage are used to compute the residual vector which is also used for training update. The residual vector is the input vector for the next cascaded stage.

The decomposition performed by the system 20 has important ramifications. If each networks 22,24 is a reliable 'principal components engine' then a fixed outer product neural network, say a VLSI implementation, may be cascaded to analyze any signal. Each cascaded subnetwork will decompose a subspace into orthogonal principal component basis vectors. By the way the cascade is implemented, all subspaces will be orthogonal; therefore, the union of all the principal components from each subspace will form another subspace of the combined principal components. In this way, the number of principal components may be extended and the signal of interest decomposed until only noise is left.

Because the network converges to a projector, this outer product neural network easily solves the Constrained Principal Components problem. That is, the space over which principal components may be derived may be restricted. This follows from the cascade property. First, form a projector spanning the (known) constraint space. Train the network on the residual of this projector, i.e. on the novelty applied to the exemplars. The OPNN will converge to the constrained solution yielding principal components orthogonal to the constraint space.

The network will converge to the projector, P. At any iteration, the network residual may be represented as:

$$\|r\|^2 = \|N_c x\|^2 + (I - \Lambda^2)^2 \|P_c x\|^2$$

where $\Lambda$ is the diagonal matrix of eigenvalues for the principal components, $\{\lambda_i\}$, of the C-matrix for the current iteration. $P_c, N_c$ are the projector and novelty for the corresponding C-matrix. Clearly, the only way for the residual to be minimized is for the $\lambda_i$ to approach the 1 for $\{\lambda_i, u_i\}$ in P. But this case is just the case where $C \to U$ and $CC^T \to UU^T = P$, U an $n \times p$ unitary matrix with the principal components as column vectors. In this case, $R = I - CC^T \to N$, the residual operator converges to the novelty which is, of course, perpendicular to P.

The outer product neural network extracts principal components from a signal and converges to a projector on the principal component subspace. The device is inherently cascadable. These features have consequences for application of the device. Since the device is cascadable, that is, the general problem may be solved by repeated application of one particular implementation, the network is suited to VLSI implementation. Since the network converges to a projector, it may track an input signal in real time, provided the statistics of the signal are not rapidly changing. The outer product neural network is particularly suited to image compression. Here it trains on patches of an image and generalizes to find the principal components. The coefficients of the principal components may then be used to represent the image and may be transmitted to a remote location. Of course, the principal component vectors must be transmitted once for each image. In this way, an image may be analyzed and compressed on the transmitter end and reconstructed on the receive end. The network is particularly suited to this because of its transpose symmetry.

Conclusion

The present invention provides a linear neural network which converges to a projector onto a principal component subspace. If the network training remains stable, the device will always converge to a projector onto the k-PE principal component subspace of the signal subspace. Network stability is relatively easy to guarantee. As a consequence of this, the residual converges to an orthogonal subspace; therefore, the device is inherently cascadable. Based upon a network architecture and a mean square minimization, a unique training rule is derived which provides robust convergence of the network. The device is particularly suited to image compression and transmission, but has application in any signal processing application where principal component are used or the signal is to be analyzed into component parts. The outer product neural network solves the constrained principal components problem in a natural way.

In reference to the training rule, the equation for $C_{n+1}$ in the above, the update factor $\gamma$ must be selected to constrain the Euclidian norm of the C matrix.

What is claimed is:

1. A neural network system, comprising:
a plurality of cascade coupled neural network means for producing an output vector including a predetermined number of principal components of an input vector and a residual vector with each subsequently coupled network means receiving as an input vector the residual vector of the immediately preceedingly coupled network means and each network means having an outer product architecture; and
means for training each neural network means to converge to a projector of a subspace of its respective principal components with the principal component subspace of each network means being orthogonal to the principal component subspace of the immediately preceedingly coupled network means.

2. The neural network system of claim 1, wherein the means for training includes the training rule $$C_{n+1}=[I+\gamma*[xr^T+rx^T]]C_n$$

wherein
$C_n$ is a present weight matrix,
$C_{n+1}$ is an updated weight matrix for the processing elements,
I is an Identity matrix,
$\gamma$ is an update factor,
x is the input vector,
r is an current residual vector, and
$T$ designates a transposed matrix.

3. The neural network system of claim 1, wherein each neural network stage comprises;
an input node for each element of its respective input vector;
an output node for each element of its respective output vector; and
a plurality of processing elements with each processing element being fully and exclusively connected to each input node and each output node.

4. The neural network system of claim 1, wherein the outer product architecture performs a pair of matrix vector operations on the input vector, which operations are represented as $C^TC$, wherein C is a weight matrix for the processing elements, and $T$ designates a transposed matrix.

5. A neural network comprising:
an outer product architecture including a plurality of input nodes for receiving the elements of an input vector, a plurality of output nodes for providing an output vector, and a predetermined number of processing elements representing principal components of the input vector with said principal components defining a subspace thereof; and
means for training the network to produce an output vector representing a projector of the input vector on to the subspace of the principal components, wherein the means for training includes the training rule $$C_{n+1}=[I+\gamma*[xr^T+rx^T]]C_n,$$

wherein
$C_n$ is a present weight matrix for the processing elements,
$C_{n+1}$ is an updated weight matrix,
I is an Identity matrix,
$\gamma$ is an update factor,
x is the input vector,
r is an current residual vector determined by subtracting the output vector from the input vector, and
$T$ designates a transposed matrix.

* * * * *